(12) United States Patent
King

(10) Patent No.: US 8,385,840 B2
(45) Date of Patent: Feb. 26, 2013

(54) PHONE SERVICE PROCESSOR

(75) Inventor: James Edward King, Wokingham (GB)

(73) Assignee: Broadcom Corporation, Irvine, CA (US)

( * ) Notice: Subject to any disclaimer, the term of this patent is extended or adjusted under 35 U.S.C. 154(b) by 807 days.

(21) Appl. No.: 11/749,730

(22) Filed: May 16, 2007

(65) Prior Publication Data
US 2008/0287070 A1 Nov. 20, 2008

(51) Int. Cl.
*H04B 1/38* (2006.01)
*H04B 17/00* (2006.01)
*H04W 24/00* (2009.01)

(52) U.S. Cl. ....... 455/73; 455/67.11; 455/423; 455/425; 455/418

(58) Field of Classification Search ............... 455/67.11, 455/423, 425, 418
See application file for complete search history.

(56) References Cited

U.S. PATENT DOCUMENTS

| | | | | |
|---|---|---|---|---|
| 5,729,675 A | * | 3/1998 | Miller et al. | 714/36 |
| 7,386,711 B1 | * | 6/2008 | Haimovsky et al. | 713/2 |
| 2003/0009687 A1 | * | 1/2003 | Ferchau et al. | 713/200 |
| 2003/0064703 A1 | * | 4/2003 | Toshida | 455/403 |
| 2003/0095648 A1 | * | 5/2003 | Kaib et al. | 379/106.02 |
| 2003/0143973 A1 | * | 7/2003 | Nagy et al. | 455/403 |
| 2004/0141461 A1 | * | 7/2004 | Zimmer et al. | 370/216 |
| 2004/0204050 A1 | * | 10/2004 | Krishnan et al. | 455/556.1 |
| 2004/0205164 A1 | * | 10/2004 | Jacobs et al. | 455/414.1 |
| 2005/0068169 A1 | * | 3/2005 | Copley et al. | 340/539.13 |
| 2005/0124331 A1 | * | 6/2005 | Munje et al. | 455/418 |
| 2005/0188277 A1 | * | 8/2005 | Tayler et al. | 714/39 |
| 2006/0069457 A1 | * | 3/2006 | Malani et al. | 700/94 |
| 2006/0205398 A1 | * | 9/2006 | Seckendorf et al. | 455/423 |
| 2007/0238479 A1 | * | 10/2007 | Rao et al. | 455/518 |

* cited by examiner

*Primary Examiner* — Temesgh Ghebretinsae
*Assistant Examiner* — Gennadiy Tsvey
(74) *Attorney, Agent, or Firm* — Garlick & Markison

(57) ABSTRACT

An integrated circuit radio transceiver and method therefor includes primary transceiver operation circuitry. In addition to routine transceiver circuitry, the radio transceiver includes a service processor module operable to support redundant operations to facilitate any one of monitoring, test, device management and boot-up sequence functions of the primary transceiver operation circuitry. The service processor module generally has necessary access to hardware components and is operable to control, initialize and monitor the hardware components to assist in test and error recovery.

20 Claims, 6 Drawing Sheets

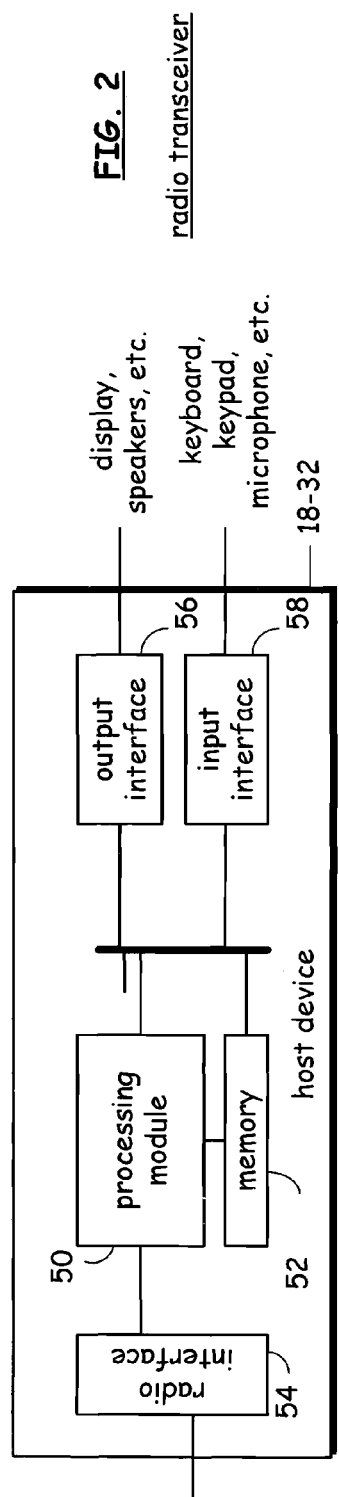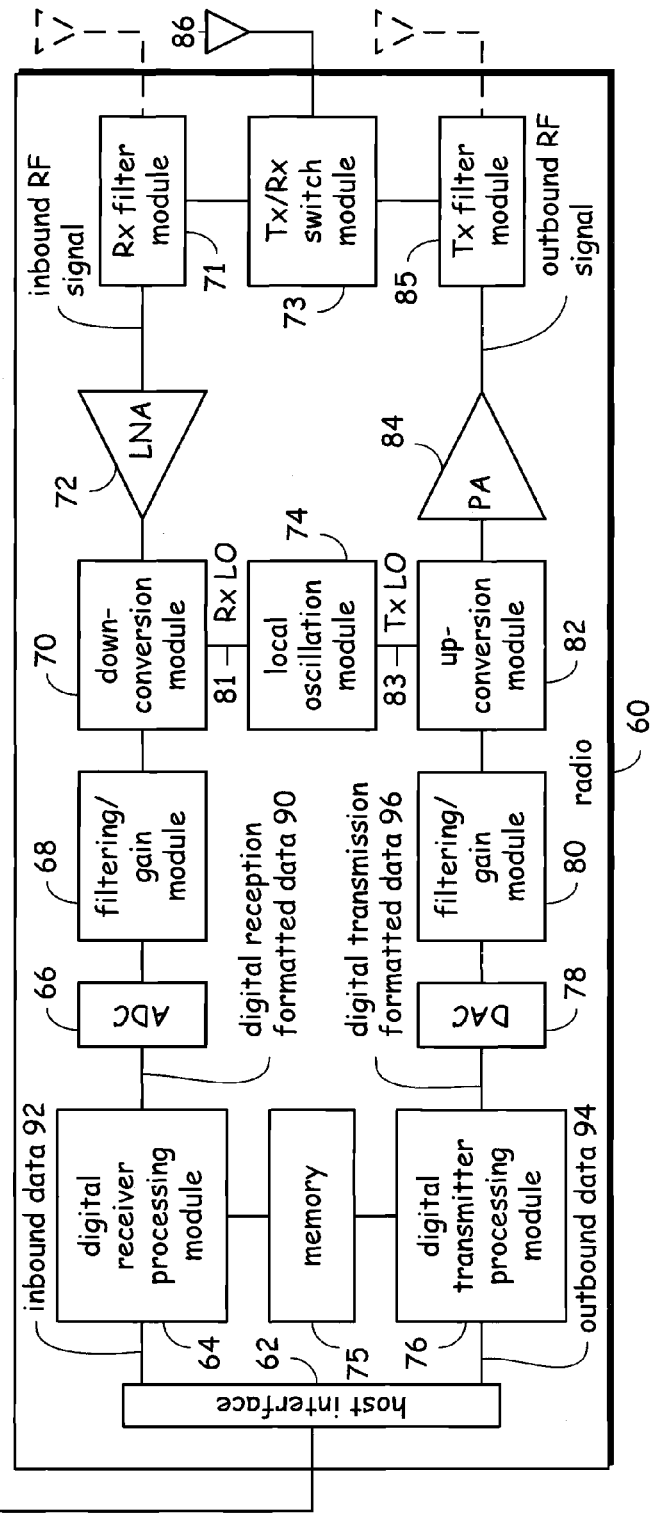

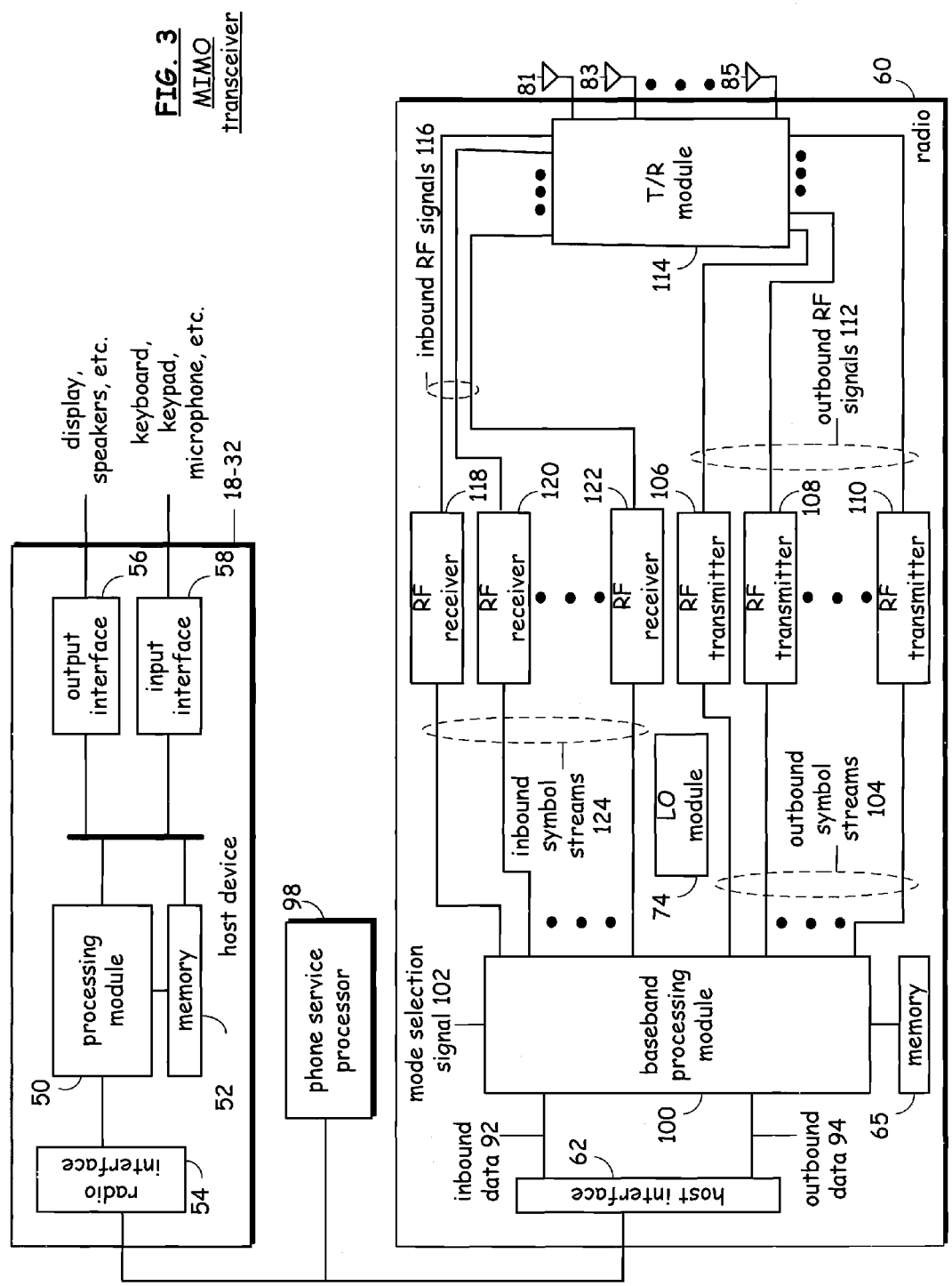

wireless transceiver 200

PHONE SERVICE PROCESSOR

BACKGROUND

1. Technical Field

The present invention relates to wireless communications and, more particularly, to circuitry for wireless communications.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

A wireless device typically has at least one processor that is operable to control operations and communications within the device as well as with other devices. For example, a wireless device may include a baseband processor and a digital signal processor for generating and processing communications. Occasionally, however, such structure does not provide the necessary operation for resolution of operational problems.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIGS. 2 and 3 are schematic block diagrams illustrating a wireless communication host device and an associated radio according to two embodiments of the present invention;

DETAILED DESCRIPTION OF THE DRAWINGS

Figure 1:
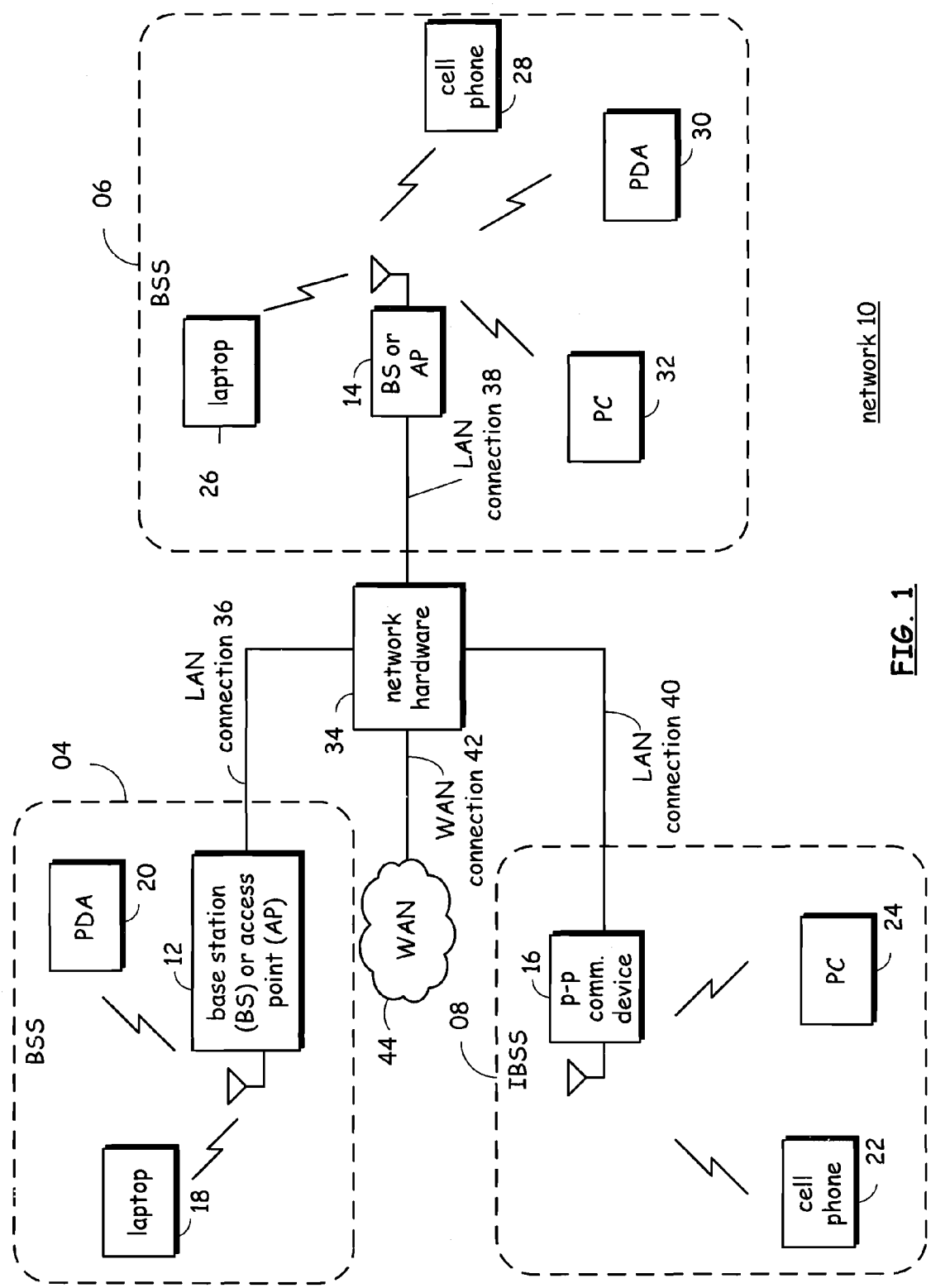
FIG. 1 is a schematic block diagram illustrating a wireless communication device that includes a host device and an associated radio.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2-10.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (e.g., IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal, which is filtered by transmitter filter module 85. The antenna 86 transmits outbound RF signal to a targeted device such as a base station, an access point and/or another wireless communication device.

Radio 60 also receives an inbound RF signal via antenna 86, which was transmitted by a base station, an access point, or another wireless communication device. The antenna 86 provides inbound RF signal to receiver filter module 71 via Tx/Rx switch module 73, where Rx filter module 71 bandpass filters inbound RF signal. The Rx filter module 71 provides the filtered RF signal to low noise amplifier 72, which amplifies inbound RF signal to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

As may further be seen, a phone service processor 98 is operably coupled to a bus coupling radio interface 54 to host interface 62. Phone service processor 98 is operable to monitor internal circuitry and communications of radio 60 by way of host interface 62 in the described embodiment of the invention and further to control operations of such circuitry based upon internal logic and upon received control commands. Phone service processor 98 may perform said functionality through other interface ports according to implementation.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-122, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100. Further, as may be seen, the MIMO transceiver of FIG. 3 further includes phone service processor 98 as described in relation to FIG. 2.

Figure 4:
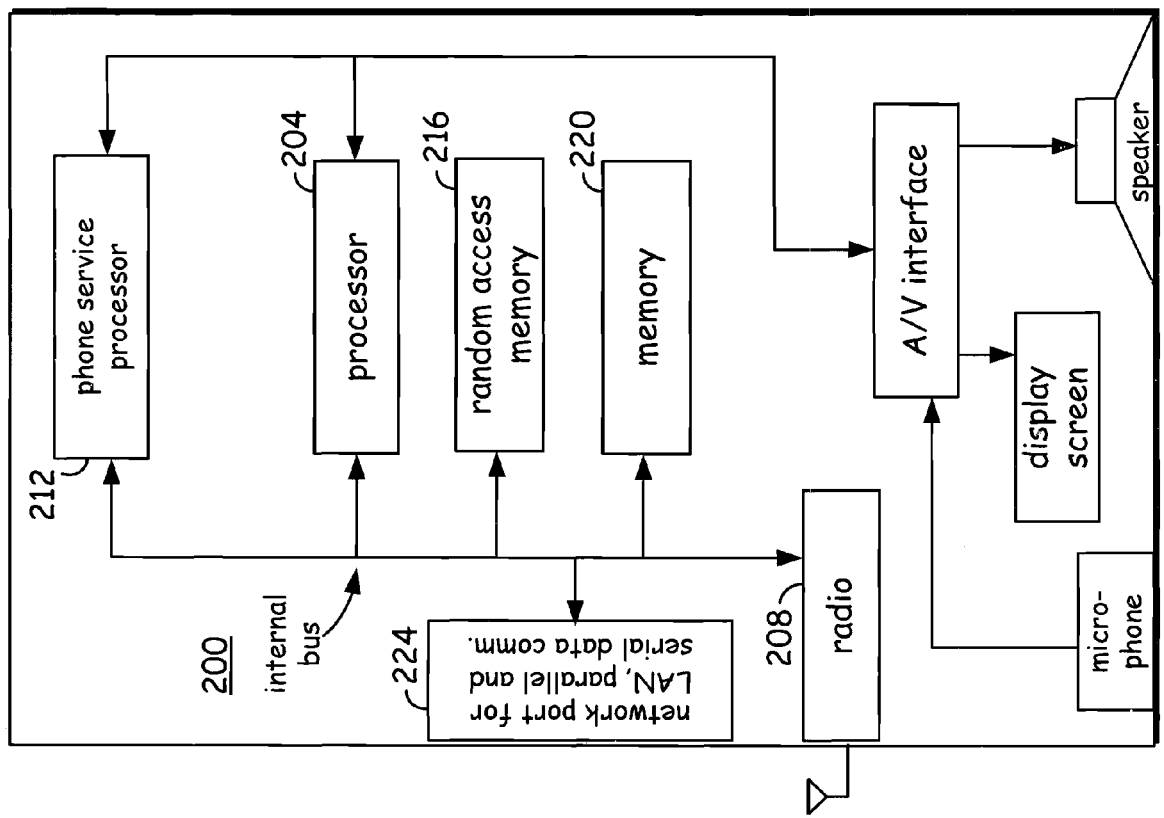
FIG. 4 is a functional block diagram of a radio transceiver that includes a phone service processor according to on embodiment of the invention.

FIG. 4 is a functional block diagram of a radio transceiver that includes a phone service processor according to an embodiment of the invention. The radio transceiver 200 includes primary transceiver operation circuitry as well as an integrated phone service processor operable to communicate with the primary transceiver operation circuitry. The primary transceiver operation circuitry includes a baseband processor 204 for processing ingoing and outgoing digital communication signals, a radio 208 that further includes transmitter front end circuitry for processing and transmitting outgoing RF signals based upon the outgoing digital communication signals and receiver front end circuitry for receiving ingoing RF signals and for processing the ingoing RF signals to produce the ingoing digital communication signals.

Radio transceiver 200 further includes a service processor module 212 operable to support redundant operations to facilitate any one of monitoring, test, device management and boot-up sequence functions of the primary transceiver operation circuitry. The service processor module 212 comprises an integrated circuit operably disposed to communicate with the primary transceiver operation circuitry required for any one of the monitoring, test and boot-up sequence functions in one embodiment of the invention. In an alternate embodiment, the service processor module 212 may comprise logic defined in memory for execution by a processor of the primary transceiver operation circuitry wherein the service processor module communicates with the primary transceiver operation circuitry required for any one of the monitoring, test and boot-up sequence functions.

Phone service processor 212 is, in the described embodiment, operable to communicate with random access memory 216 and memory 220 by way of an internal bus. In the described embodiment, memory 220 is a Flash memory for code and data storage. The phone service processor 212, in one embodiment, is operable as a master device on a shared bus which gives full read and write access to all the memory devices by the service processor 212 and allows for communication between the service processor 212 and the main processor 204 to be performed using a fixed region of the RAM whereby they can both read and write to buffers in that region. In one specific embodiment, therefore, the service processor 212 is operable as a master on a shared ARM Host Bus (AHB) which is used by the main processor to access memory. This embodiment allows for all the service processor functionality described herein to be implemented without any particular hardware access issues as the bus already contains multiple access arbitration to deal with the existing multiple masters such as the DMA controller and main processor.

One side effect of this implementation is that the service processor 212 has to be fast enough to be able to master the AHB and thus there are cost and power implications. Thus, the service processor 212 is operable to conserve power whenever possible while still remaining in a state whereby it will act upon any input from the user interface(s). Such a scheme may be interrupt driven or implemented by providing adequate power up for periodic polls. In an alternate embodiment, in order to reduce cost of the device, the service processor 212 may be connected to the main processor 204 via a low cost and lower speed serial interface. In this embodiment, service processor 212 requests the main processor 204 to access memory for specified functions, for example to verify the software images. In the described embodiments, however, in which the wireless device is formed the service processor is operable as a bus master and has the required processing speed.

Phone service processor 212 is further operable to communicate with radio 208 and port 224 by way of the internal bus. Port 224 is for wired connections to allow external devices to communicate with phone service processor 212 for associated functionality. External devices may also communicate with phone service processor 212 by way of radio 208. In general terms, any communication through port 224 or by radio 208 may be referenced as being control commands from the external device.

Figure 5:
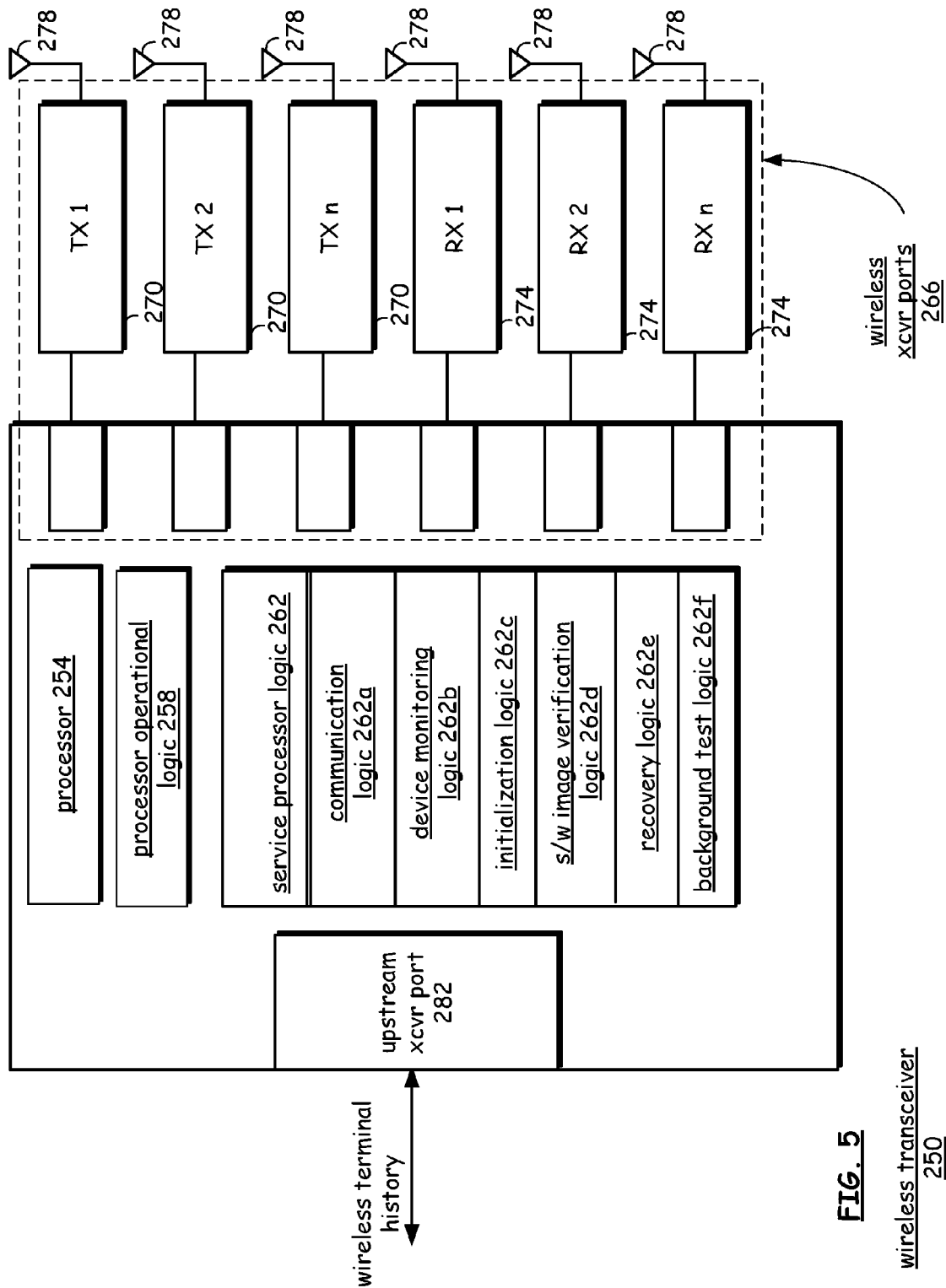
FIG. 5 is a functional block diagram of a wireless radio transceiver that includes service processor logic according to one embodiment of the invention.

FIG. 5 is a functional block diagram of a wireless radio transceiver that includes service processor logic according to one embodiment of the invention. As may be seen, a wireless radio transceiver 250 includes a processor 254 and associated processor operational logic 258. Processor operational logic 258 includes discrete logic as well as logic formed in software that is executed by processor 254 in its various embodiments. Wireless transceiver 250 further includes service processor logic 262. Service processor logic 262 is formed in hardware as a separate processor with associated support logic and circuitry in embodiment and is defined by software logic executed by processor 254 in an alternate embodiment.

Service processor logic 262 further includes communication logic 262a, device monitoring logic 262b, initialization logic 262c, software image verification logic 262d, recovery logic 262e and background test logic 262f. Each of the logic blocks 262a-262f is operably disposed to access memory, circuit elements, communication paths and input/output ports as necessary for performing its associated functions. More specifically, communication logic 262a is operable to communicate with external devices according to a specified protocol. For example, in one embodiment, communication logic 262a is operable to communicate according to a protocol similar to the IPMI standard for networked devices. Through such communications, service processor logic 262 is operable to receive and perform according to control commands to perform test procedures, device management, and boot-up sequence functions for the processor 254 and associated wireless transceiver circuitry and logic. The communication logic 262a is further operable to report circuit conditions such as specified voltage levels, circuit breaker states, temperature, and other specified condition monitoring. The communication circuitry 262a is further operable to receive and report reset or shutdown commands received from an external device.

In associate with communication logic 262a, device monitoring logic 262b is operable to perform the described monitoring and to provide acquired data to the communication logic 262a or to other operational logic in a specified manner. Initialization logic 262c includes commands to initialize the wireless transceiver 250 or to initialize a circuit element, device or circuit according to specified logic or received control commands from an external device. For example, if the primary operational circuitry and or logic of the wireless transceiver 250 locks up, device monitoring logic 262b is operable to obtain specified data, to provide such specified data to communication logic 262a for transmission to an external device. Communication logic 262a then is operable to subsequently receive a reset or reinitialization command to prompt initialization logic 262c to re-initialize a portion of wireless transceiver 250 (i.e., a specific circuit or device) or to re-initialize the entire phone to reset the device. The initialization logic 262c further includes logic for defining initial data values and operational states and modes of specified circuits.

Wireless transceiver 250 further includes software image verification logic 262d that is operable to examine a software image to ensure that that software image is not corrupted and has properly loaded into memory. Transceiver 250 further includes recovery logic 262e that defines error recovery logic to enable transceiver 250 to continue or resume proper operations after an error event. The embodiment of FIG. 5 further illustrates background test logic 262f which is operable to perform tests in the background in a way that does not interfere with normal operations of the wireless transceiver 250.

Finally, as may be seen, wireless transceiver 250 includes at least one upstream transceiver port 282 for providing wireless terminal history, operational data, test results, etc., and to receive control commands, by way of a wired network to and from an external device. Wireless transceiver 250 also includes at least one transmit front end 270 and at least one receive front end 274 for wireless communications. In the embodiment shown in FIG. 5, wireless transceiver 250 is a multiple-in multiple-out (MIMO) transceiver having transceiver ports 266 that include at least two transmit front ends 270 and at least two receive front ends 274. All communications of wireless transceiver 250 may be through transceiver ports 266 and the described circuitry included therein through one or more antennas 278 or may be through the wired upstream transceiver port 282.

In operation, radio transceiver 250 is operable to perform any one of monitoring, test, device management and boot-up sequence functions of the primary transceiver operation circuitry according to specified logic and, alternatively, is controllable by an external device by way of an external communications interface for performing such functions. For example, in one embodiment, the service processor module is operably disposed to communicate with internal components for a variety of purposes. More specifically, the service processor is operably disposed to communicate by way of a main ARM subsystem bus and/or to external GPIO pins for hardware monitoring. Through these and other connections, the service processor module is operable to initialize at least one of the system buses, the random access memory, flash memory and test interfaces, to verify software images prior to being loaded and to verify the software images are properly loaded into the random access memory. Moreover, the service processor module is operable to perform startup sequencing for multiple processor systems to reduce initialization time and to generate control signals to solve synchronization problems for the wireless transceiver. Further, the service processor module is operable to reset or shut down the wireless transceiver based upon internal logic or based upon a received command from an external interface.

In more general terms, the radio transceiver includes a first processor for supporting routine radio operations and a second processor for supporting service processor operations to facilitate any one of monitoring, test, device management and boot-up sequence functions. The first and second processors are formed as separate integrated circuits and are operably disposed to support functions of each other. Any one of monitoring, test, device management and boot-up sequence functions of the second processor is controllable by an external device by way of an external communications interface.

Moreover, the second processor is operable to initialize at least one of the system buses, the random access memory, flash memory and test interfaces for test and or recovery purposes while the first processor also has such capabilities for routine operations and operational modes. Additionally, however, the second processor is operable to verify software images prior to being loaded and to verify the software images are properly loaded into the random access memory. In one embodiment, the first and second processors are formed as a dual core processor system of a single integrated circuit. Alternatively, the first and second processors may be formed within separate die within a common multi-chip package.

Figure 6:
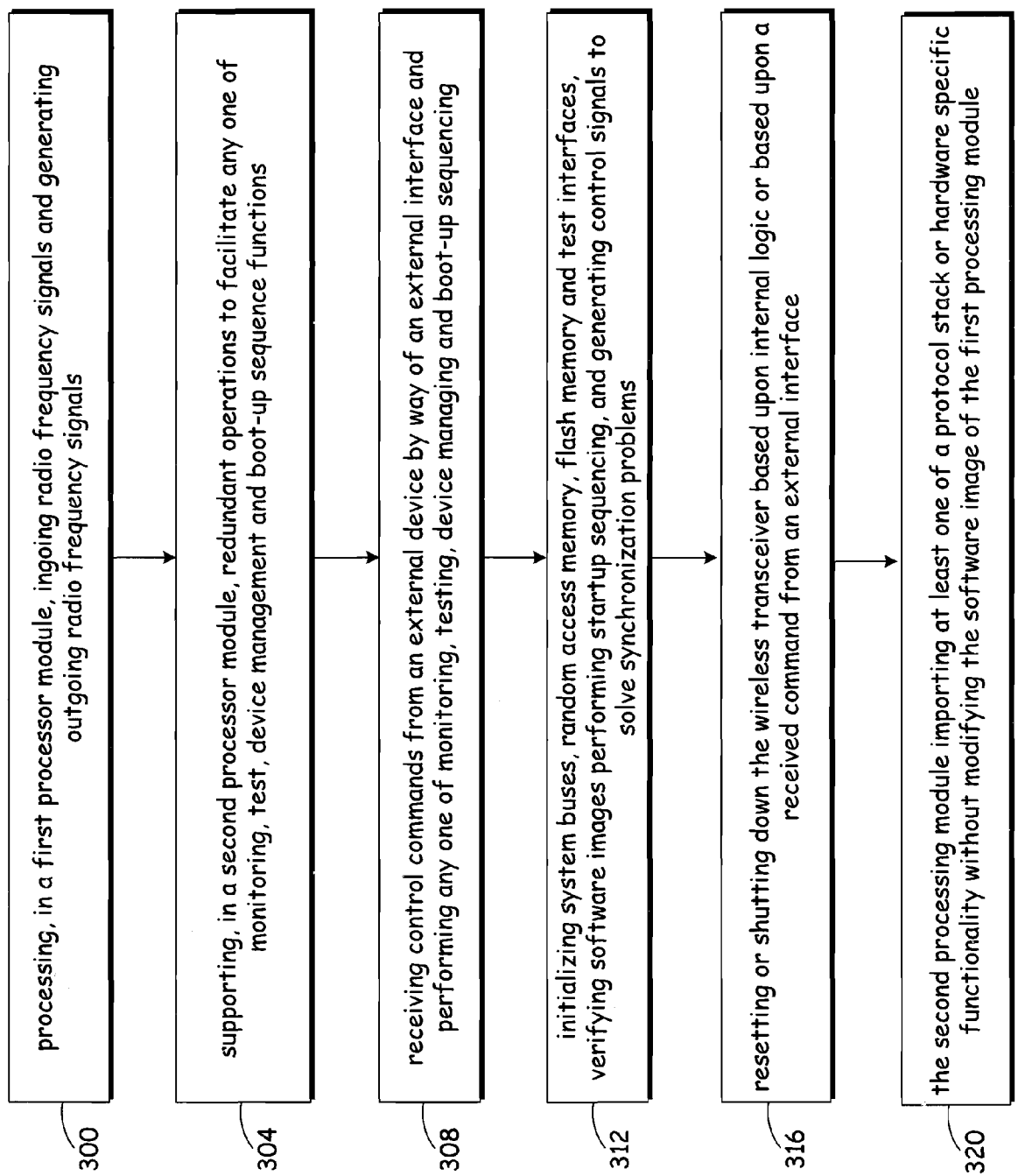
FIG. 6 is a flow chart that illustrates a method for a radio transceiver for supporting any one of redundant operations, monitoring, test, includes processing, device management, and boot-up sequencing among other functions according to one embodiment of the present invention.

FIG. 6 is a flow chart that illustrates a method for a radio transceiver for supporting any one of redundant operations, monitoring, test, includes processing, device management, and boot-up sequencing among other functions according to one embodiment of the present invention. The method includes, in a first processor module, processing ingoing radio frequency signals and generating outgoing radio frequency signals (step 300) and supporting, in a second processor module, redundant operations to facilitate any one of monitoring, test, device management and boot-up sequence functions of the first processor module (step 304). These steps may also include the second processor module communicating with first processor module for any one of the monitoring, testing and boot-up sequencing functions.

The method further includes the second processor module receiving control commands from an external device by way of an external interface and performing any one of monitoring, testing, device managing and boot-up sequencing of the first processor module based upon received control commands (step 308). The method further includes the second processor module initializing at least one of the system buses, the random access memory, flash memory and test interfaces, verifying software images prior to being loaded, verifying the software images are properly loaded into the random access memory, performing startup sequencing for multiple processor systems to reduce initialization time, and generating control signals to solve synchronization problems for the wireless transceiver (step 312).

A method further includes the second processing module resetting or shutting down the wireless transceiver based upon internal logic or based upon a received command from an external interface (step 316). The method further includes the second processing module importing at least one of a protocol stack or hardware specific functionality without modifying the software image of the first processing module as well as the second processor resetting or reinitializing specific circuit elements of the first processing module to avoid the first processing module having to perform a reset to correct a problem (step 320).

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A radio transceiver, comprising:
primary transceiver operation circuitry that includes an operational processor formed in hardware on an integrated circuit to perform routine operations, the primary transceiver operation circuitry further comprising:
baseband processor for processing ingoing and outgoing digital communication signals;
transmitter front end for processing and transmitting outgoing RF signals based upon the outgoing digital communication signals; and
receiver front end for receiving ingoing RF signals and for processing the ingoing RF signals to produce the ingoing digital communication signals; and
a service processor formed in hardware that is also on the integrated circuit and separate from the operational processor and in which the service processor operates as a master on a shared bus used by the operational processor, wherein the service processor includes communication logic, device monitoring logic, initialization logic, software image verification logic, recovery logic and test logic, in which the service processor is operable to perform monitoring, test, device management, boot-up sequence and verify software images functions associated with the primary transceiver operation circuitry, and wherein the service processor is coupled to the transmitter front end and the receiver front end through the shared bus and is further operable to reset or shut down the radio transceiver.

2. The radio transceiver of claim 1 wherein the service processor is controllable by an external device by way of an external communications interface.

3. The radio transceiver of claim 1 wherein the service processor is operable to initialize at least one of a system bus, random access memory, flash memory and test interface.

4. The radio transceiver of claim 1 wherein the service processor is operable to verify software images prior to being loaded.

5. The radio transceiver of claim 4 wherein the service processor is operable to verify that the software images are properly loaded into a memory.

6. The radio transceiver of claim 1 wherein the service processor is operable to support startup sequencing for multiple processor systems to reduce initialization time.

7. The radio transceiver of claim 1 wherein the service processor is operable to generate control signals to support monitoring and control for the radio transceiver based on externally generated commands.

8. The radio transceiver of claim 1 wherein the service processor is operable to reset or shut down the radio transceiver based upon internal logic or based upon a received command from an external interface.

9. A radio transceiver, comprising:
a first processor formed in hardware on an integrated circuit for supporting routine radio operations, in which the first processor is coupled to a radio front end to control transmission and reception of radio frequency signals; and a second processor formed in hardware that is also on the integrated circuit and separate from the first processor and in which the second processor is a service processor that operates as a master on a shared bus used by the operational processor, wherein the second processor includes communication logic, device monitoring logic, initialization logic, software image verification logic, recovery logic and test logic to perform monitoring, test, device management, boot-up sequence and verify software images functions associated with the first processor, and wherein the second processor is also coupled to the radio front end through the shared bus and is further operable to reset or shut down the radio transceiver.

10. The radio transceiver of claim 9 wherein the second processor is controllable by an external device by way of an external communications interface.

11. The radio transceiver of claim 9 wherein the second processor is operable to initialize at least one of a system bus, random access memory, flash memory and test interface.

12. The radio transceiver of claim 9 wherein the second processor is operable to verify software images prior to being loaded into a memory and to verify that the software images are properly loaded into the memory.

13. The radio transceiver of claim 9 wherein the first and second processors are formed as dual core processors of a dual core processor system on the integrated circuit.

14. A method for a radio transceiver, comprising:
processing, in a first processor formed in hardware on an integrated circuit, ingoing radio frequency signals and generating outgoing radio frequency signals, the first processor coupled to a radio front end for reception of the ingoing radio frequency signals and for transmission of outgoing radio frequency signals; and
performing, in a second processor formed in hardware that is also on the integrated circuit and separate from the first processor, monitoring, test, device management, boot-up sequence and verify software images functions associated with the first processor, in which the second processor is a service processor that operates as a master on a shared bus used by the first processor, wherein the second processor includes communication logic, device monitoring logic, initialization logic, software image verification logic, recovery logic and test logic to perform the monitoring, test, device management, boot-up sequence and verify software images functions, and wherein the second processor is also coupled to the radio front end through the shared bus and is further operable to reset or shut down the radio transceiver.

15. The method of claim 14 including the second processor communicating with the first processor to perform the monitoring, test and boot-up sequencing functions.

16. The method of claim 14 including the second processor receiving control commands from an external device by way of an external interface to perform the monitoring, test, device management, boot-up sequence and verify software images functions based upon the received control commands.

17. The method of claim 14 including initializing at least one of a system bus, memory and test interface, verifying software images prior to being loaded in to the memory, verifying that the software images are properly loaded into the memory, performing startup sequencing for multiple processor systems, and generating control signals for the radio transceiver.

18. The method of claim 14 including resetting or shutting down the radio transceiver based upon internal logic or based upon a received command from an external interface.

19. The method of claim 14 further including the second processor resetting or reinitializing specific circuit elements of the first processor to avoid the first processor from having to perform a reset to correct a problem.

20. The method of claim 14 wherein the first and second processors are formed as dual core processors of a dual core processor system formed on an integrated circuit.

* * * * *